United States Patent
Tendyra et al.

(10) Patent No.: US 11,208,837 B2
(45) Date of Patent: Dec. 28, 2021

(54) DOOR SYSTEM WITH A DECELERATION MECHANISM

(71) Applicant: AIRBUS HELICOPTERS DEUTSCHLAND GMBH, Donauworth (DE)

(72) Inventors: Thomas Tendyra, Schwenningen (DE); Uwe Renner, Friedberg (DE); Xaver Pascoe, Munich (DE); Markus Buehlmeyer, Buttenwiesen (DE); Stephen Ward, Donaumuenster (DE); Guido Borchers, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 257 days.

(21) Appl. No.: 16/687,910

(22) Filed: Nov. 19, 2019

(65) Prior Publication Data

US 2020/0277815 A1   Sep. 3, 2020

(30) Foreign Application Priority Data

Feb. 28, 2019   (EP) .................................... 19400007

(51) Int. Cl.
*E05F 5/00* (2017.01)
*B64C 1/14* (2006.01)
(Continued)

(52) U.S. Cl.
CPC .................. *E05F 5/00* (2013.01); *B64C 1/00* (2013.01); *B64C 1/1469* (2013.01); *E05F 15/72* (2015.01);
(Continued)

(58) Field of Classification Search
CPC ........ E05F 5/00; E05F 15/72; E05Y 2400/21; E05Y 2400/44; E05Y 2900/502; B64C 1/00; B64C 1/1469; B64C 2001/009
See application file for complete search history.

(56) References Cited

U.S. PATENT DOCUMENTS 3,809,419 A   5/1974   Chezem
4,230,352 A   10/1980  Sealey et al.
(Continued)

FOREIGN PATENT DOCUMENTS

EP   1832508 A1   9/2007
WO   201657578 A1   4/2016

OTHER PUBLICATIONS

European Search Report for European Application No. EP 19400007. 1, Completed by the European Patent Office, dated Jul. 25, 2019, 8 pages.

*Primary Examiner* — Justin B Rephann
(74) *Attorney, Agent, or Firm* — Brooks Kushman P.C.

(57) ABSTRACT

A door system with a deceleration mechanism may be adapted to control an opening of a door module that separates compartments of an aircraft and includes a door panel and a door frame. During the opening of the door module, the door panel performs a rotational movement 389 above a floor structure of the aircraft. The deceleration mechanism is operable in a normal operation mode and a deceleration mode and comprises a hinge, a wedge-shaped component that is rotatably attached to the hinge, and an activation device. The activation device is coupled to the wedge-shaped component and switches the deceleration mechanism from operating in the normal operation mode to operating in the deceleration mode when a difference in pressure between the compartments exceeds a predetermined threshold.

15 Claims, 7 Drawing Sheets

(51) Int. Cl.
*E05F 15/72* (2015.01)
*B64C 1/00* (2006.01)

(52) U.S. Cl.
CPC ..... *B64C 2001/009* (2013.01); *E05Y 2400/21* (2013.01); *E05Y 2400/44* (2013.01); *E05Y 2400/52* (2013.01); *E05Y 2900/502* (2013.01)

(56) References Cited

U.S. PATENT DOCUMENTS

| | | | | |
|---|---|---|---|---|
| 7,712,705 | B2* | 5/2010 | French | B64C 1/1469 244/129.5 |
| 9,114,869 | B1* | 8/2015 | Barrett | B64C 1/1469 |
| 2003/0127563 | A1* | 7/2003 | LaConte | B64C 1/1423 244/129.1 |
| 2003/0132345 | A1* | 7/2003 | Lehmann | B64D 25/00 244/118.5 |
| 2003/0192989 | A1* | 10/2003 | Owen | B64D 45/0028 244/118.5 |
| 2004/0094670 | A1 | 5/2004 | Pratt et al. | |
| 2004/0239126 | A1* | 12/2004 | Pratt | B64D 45/0028 292/227 |
| 2005/0082433 | A1* | 4/2005 | Saku | B64D 45/0028 244/129.5 |
| 2006/0048449 | A1 | 3/2006 | Roques et al. | |
| 2008/0054123 | A1* | 3/2008 | French | B64C 1/1469 244/129.5 |
| 2008/0111025 | A1* | 5/2008 | Saku | B64D 45/0028 244/129.5 |
| 2009/0057490 | A1* | 3/2009 | Klarmann | B64C 1/1469 244/129.5 |
| 2011/0201262 | A1* | 8/2011 | Lehmann | B64C 1/1469 454/74 |
| 2013/0269256 | A1* | 10/2013 | Poth | B64C 1/1469 49/31 |
| 2013/0269258 | A1* | 10/2013 | Koch | E05C 7/02 49/67 |
| 2019/0144098 | A1* | 5/2019 | Gallagher, Jr. | E05C 19/001 244/118.5 |
| 2020/0115028 | A1* | 4/2020 | Tendyra | E05B 17/0041 |

* cited by examiner

Fig. 2C
Section A-A

DOOR SYSTEM WITH A DECELERATION MECHANISM

CROSS-REFERENCE TO RELATED APPLICATIONS

This application claims priority to European patent application No. EP 19400007.1 filed on Feb. 28, 2019, the disclosure of which is incorporated in its entirety by reference herein.

BACKGROUND OF THE INVENTION

(1) Field of the Invention

The invention is related to a deceleration mechanism for a door system, and, more particularly, to a mechanism for decelerating a door opening movement in case of a compartment decompression in an aircraft.

(2) Description of Related Art

Most aircrafts have a door that separates the cockpit from the remaining portions of the aircraft. For example, due to safety concerns, commercial aircrafts usually have a door that separates the cockpit (i.e., the pilot area) from the cabin (i.e., the passenger area). The door that separates the cockpit from the cabin is sometimes also referred to as the cockpit door.

When cruising at high altitudes, the cockpit and cabin of aircrafts are usually pressurized at a pressure that is higher than the ambient pressure. In some situations, the pressure in the cockpit may drop rapidly and become much lower than the pressure in the cabin. For example, a bird may strike and break a cockpit window causing such a rapid pressure drop in the cockpit. In this case, a fast decompression of the cabin is necessary to avoid an aggravating of the situation in which the structural loads of the aircraft could exceed its load limits which would ultimately result in the crash of the aircraft.

Generally, the cockpit door aboard the aircraft provides the primary means of dissipating pressure from the cabin to the cockpit during a cockpit decompression case. A cockpit decompression case may occur as a minimal opening involving relatively slow bleed pressure or as a maximum opening involving a rapid loss of pressure. To ensure that the difference in pressure between the cabin and the cockpit does not exceed structural limitations of the aircraft, the cockpit door must be released and opened within a short time period. The time for opening the cockpit door includes the time for releasing the door lock and the time for rotating the door into the open position.

To satisfy certification requirements defined by aviation authorities, it has to be demonstrated that an aircraft can sustain a decompression case without a subsequent loss of essential structure/equipment and life. For example, JAR 25.365(e)(2) specifies that the aircraft structure must be able to withstand the depressurization caused by an instant opening of a predetermined area in the pressurized shell at any operating altitude.

Document EP 1 832 508 A1 describes an operation mechanism that is adapted for activating a deceleration device for decelerating an opening movement of a door. The operation mechanism features a first mode of operation and a second operation mode. In the first mode of operation the operation mechanism allows free rotation of the door, when the operation mechanism is loaded by an impulse of the door below a predetermined threshold value. In the second mode of operation when the operation mechanism is loaded by an impulse of the door above the predetermined threshold value the operation mechanism free rotation of the door by connecting the door to the deceleration device which will then decelerate the acceleration of the door.

Document 2004/0094670 A1 describes a method and apparatus for maintaining a panel in a closed position and releasing a panel upon application of changes resulting from a pressure change in an area adjoining the panel. The apparatus includes a latch mechanism attached to a structure that comprises a bolt for engaging a corresponding panel. The latch mechanism may be retained on the corresponding panel with the bolt engaging the structure. A pressure responsive device is provided to detect a change in pressure on one side of the panel and facilitating release of the bolt in response to a pressure change of a predetermined range or force. The latch mechanism and pressure responsive device vent to or communicate with only one side of the panel. A reservoir on one side of the panel communicates with a pressure responsive chamber of the pressure responsive device. The reservoir is generally on the same side of the panel to provide a pressure volume which is generally isolated from ambient pressure, such as during a decompression event. The method includes a method of maintaining a latch mechanism in a closed position subject to a pressure change, including sensing the pressure change on only one side of the panel.

Document U.S. Pat. No. 3,809,419 A describes occupant safeguarding door stop means expressly designed and adapted for protective use on an interior surface near the lower edge and corner portion of a vertically hinged inwardly openable door. It comprises a mounting base or bracket screwed or otherwise fixed, and a complemental leg member hingedly mounted and depending and having a laterally directed contoured foot portion whose underneath side is equipped with a normally elevated anti-slipping floor engaging shoe. Spring means functions to yieldingly lift and release the foot-equipped leg and permits the leg to be forced down to the desired door stop position. Releasable spring-loaded latching means functions to hold the door stop in its safety door retaining position.

Document U.S. Pat. No. 4,230,352 A describes a pivotably mounted door stop linkage having a resilient member acting on the linkage. The door stop linkage is adapted to maintain the door stop in position, for conventional door operation while allowing rotation of the stop to release the door in reaction to a pressure differential acting across the door.

Document WO 2016/57578 A1 describes a removable, remotely-controlled door locking apparatus that secures a door in a locked (or locked open) position without a key such as to resist a forced entry through the door. The removable, remotely-controlled door locking apparatus includes a housing configured for temporary fixed engagement to a portion of the door. The housing has a front facing surface sloped forward and downward at an angle from horizontal as taken from a top to a bottom of the apparatus, and an actuator arranged therein so as to be substantially parallel to the sloping front facing surface between upper and lower ends thereof. The apparatus may further include a movable foot attached to the actuator and configured, under actuator control, to be extended in a lock state against a floor surface to secure the door or retracted in an unlock state, based on a wireless signal received from a remote smart device.

However, most of the current solutions that open a door when a difference in pressure is detected are based on door systems that have a mechanism for activating the deceleration device, eventually combined with a coupling mechanism that connects the door to the deceleration device. These solutions in additional potential failure sources. For example, the activation mechanism and/or the coupling mechanism may fail in case of an emergency.

Moreover, deceleration systems with an activation and/or coupling mechanism are often complicated and heavy. Furthermore, deceleration systems often require installations on the door panel which render the door panel heavy and cumbersome to operate. Such systems are also less suited for retrofitting.

BRIEF SUMMARY OF THE INVENTION

Based on the limitations and drawbacks of the prior art, an objective is to provide a door system for controlling an opening of a door module that separates compartments of an aircraft and comprises a door panel and a door frame. The door system should enable a controlled opening of the door when the air pressure difference between the area that are separated by the door module exceeds a predetermined threshold. The door system should have a simple and light-weight design, have less failure sources than current door systems, and be easy to install. The deceleration mechanism should be fast, reliable, and operate without a coupling mechanism.

This objective is solved by an apparatus comprising the features of claim 1.

More specifically, a door system adapted to control an opening of a door module that separates compartments of an aircraft, wherein the door module comprises a door panel and a door frame, and wherein the door panel performs a rotational movement above a floor structure of the aircraft during an opening of the door module, comprises a deceleration mechanism. The deceleration mechanism comprises a hinge, a wedge-shaped component, and an activation device. The wedge-shaped component is rotatably attached to the hinge, wherein during the rotational movement of the door panel from a closed position to any open position: the wedge-shaped component is embedded in the floor structure of the aircraft to prevent an interaction with the door panel in the normal operation mode, and the wedge-shaped component protrudes from the floor structure of the aircraft and interacts with the door panel such that the rotational movement of the door panel is decelerated at least between a first open position and a second open position in the deceleration mode. The activation device is coupled to the wedge-shaped component and switches the deceleration mechanism from operating in the normal operation mode to operating in the deceleration mode when a difference in pressure between the compartments exceeds a predetermined threshold.

The wedge-shaped component may be integrated in the floor respectively in the floor panel located in front of a door that separates compartments of the aircraft. The wedge-shaped component may be activated in the event that a fast decompression situation in one of the compartments occurs.

After activation of the wedge-shaped component, the deceleration of the door opening may be controlled over the complete opening angle of the door panel. In a first step, the door panel may be free to move to achieve the needed venting area. In a second step, the wedge-shaped component may perform a controlled deceleration of the door panel. This deceleration is achieved at the interface between the wedge-shaped component and the lower edge of the door panel. For example, the wedge-shaped component may be provided with different surfaces and/or geometries and/or different contact pressure and stiffness at the interface to the door panel's lower edge.

As a result, the door system may have less failure sources than conventional door systems. The deceleration mechanism may be simply installed and require a low maintenance effort, while providing a fast and reliable activation of the deceleration function. Furthermore, the system is well suited for retrofitting and a coupling mechanism may be omitted. The door panel may be lightweight, because the declaration mechanism is installed in the floor structure.

According to one aspect, the door module further comprises a door closer that biases the door panel into the closed position.

According to one aspect, the door closer further comprises a door damper that is coupled to the door panel; a first pivot arm that is coupled to the door damper; and a second pivot arm that is coupled between the first pivot arm and the door frame.

According to one aspect, the door system further comprises a pressure sensor that monitors a pressure in at least one of the compartments; and a controller that is coupled to the pressure sensor, monitors the difference in pressure between the compartments of the aircraft, and generates an activation signal when the difference in pressure between the compartments exceeds the predetermined threshold.

According to one aspect, the activation device receives the activation signal from the controller and switches the deceleration mechanism from operating in the normal operation mode to operating in the deceleration mode based on the activation signal.

According to one aspect, the door system further comprises a door locking system that maintains the door panel in the closed position.

According to one aspect, the door locking system further comprises a door release system that overrides the door locking system and releases the door panel from the closed position when the difference in pressure between the compartments exceeds the predetermined threshold.

According to one aspect, the door release system overrides the door locking system based on the activation signal from the controller.

According to one aspect, the wedge-shaped component further comprises a first segment that interacts with the door panel between the closed position and the first open position in the deceleration mode; and a second segment that interacts with the door panel between the first open position and the second open position in the deceleration mode.

According to one aspect, the first segment further comprises a smooth surface that limits interaction with the door panel to ensure a predetermined reduction of the difference in pressure between the compartments within a predetermined time period.

According to one aspect, the second segment further comprises at least one of a wave-shaped or concave-shaped surface that interacts with the door panel such that the rotational movement of the door panel is decelerated.

According to one aspect, the activation device further comprises a movable pin that pushes against the deceleration mechanism; and at least one of a solenoid, or a pyrotechnical device, wherein the at least one of the solenoid or the pyrotechnical device pushes the movable pin against the wedge-shaped component such that the deceleration mechanism switches from operating in the normal operation mode to operating in the deceleration mode.

According to one aspect, the deceleration mechanism further comprises a mechanical end stop that stops the door panel at the second open position of the door panel.

According to one aspect, the mechanical end stop is attached to the door frame.

Furthermore, a method for controlling an opening of a door module using the above-mentioned door system, wherein the door module separates first and second compartments of an aircraft and comprises a door panel and a door frame, wherein the door panel performs a rotational movement above a floor structure of the aircraft during an opening of the door module, the method comprising: determining whether a difference between a first air pressure of the first compartment and a second air pressure of the second compartment exceeds a predetermined air pressure difference threshold; in response to determining that the difference between the first air pressure of the first compartment and the second air pressure of the second compartment exceeds the predetermined air pressure difference threshold, overriding a door locking system that keeps the door panel in a closed position, and activating an activation device; with the activation device, pushing against a wedge-shaped component that is embedded in the floor structure of the aircraft such that the wedge-shaped component protrudes from the floor structure of the aircraft and interacts with the door panel; with a smooth surface of the wedge-shaped component limiting interaction with the door panel to ensure a predetermined reduction of the difference between the first air pressure of the first compartment and the second air pressure of the second compartment within a predetermined time period; and with at least one of a wave-shaped or concave-shaped surface, interacting with the door panel such that the rotational movement of the door panel is decelerated.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Exemplary embodiments may be included in any vehicle with a door that separates two pressurized compartments, and in which a rapid change in pressure in only one of the compartments would compromise the structural integrity of the vehicle. Examples of such vehicles may include aircrafts such as airplanes, multicopters, helicopters, drones, etc.

Figure 1:
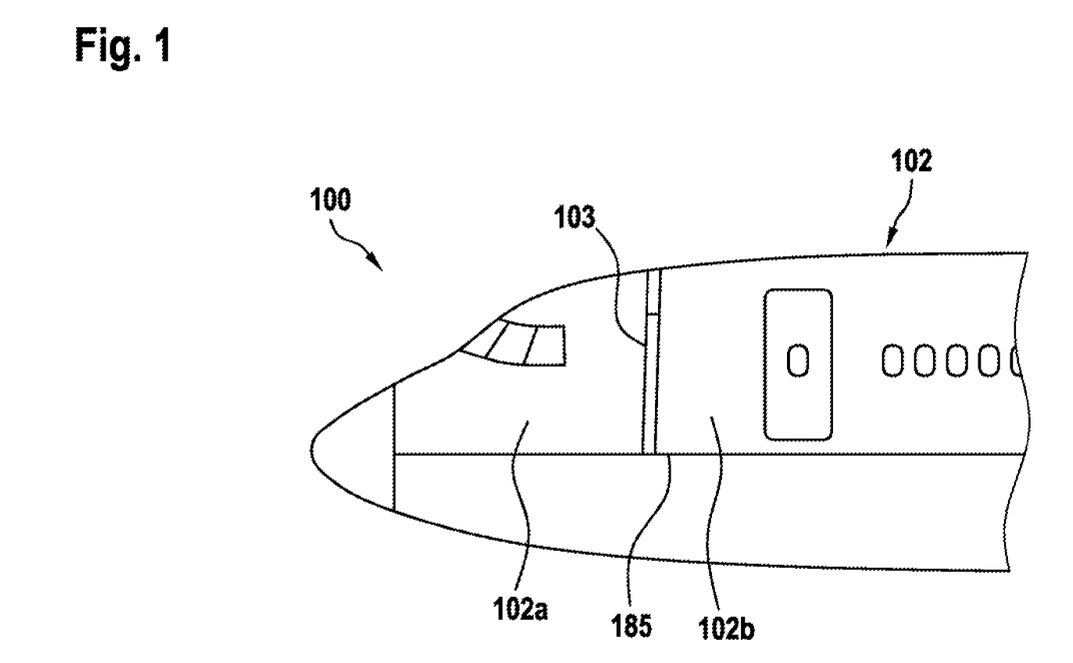
FIG. 1 is a diagram of an illustrative aircraft with a door module in accordance with some embodiments.

FIG. 100 shows an example of a vehicle 100. As shown in FIG. 1, vehicle 100 may be an aircraft, and, more particularly, an airplane. Aircraft 100 is exemplarily embodied with fuselage 102 that includes compartments 102a and 102b. A structural separation may separate compartments 102a and 102b of aircraft 100 from each other. The structural separation may include a door module 103.

In some embodiments, compartments 102a, 102b may include the cockpit, the cabin, the cargo compartment, etc. As an example, door module 103 may provide access between the cockpit and the cabin of aircraft 100. As another example, door module 103 may provide access between the cockpit and the cargo compartment, or between the cabin and the cargo compartment.

Door module 103 may have a door frame and a door panel. The door panel may be attached to the door frame with hinges. During the opening of the door module, the door panel may perform a rotational movement above floor structure 185 of aircraft 100.

If desired, door module 103 may provide a function for dissipating a pressure difference between compartments 102a and 102b of aircraft 100. For example, compartments 102a and 102b may be pressurized, and door module 103 may dissipate the pressure difference between compartments 102a and 102b in case of a rapid decompression of one of compartments 102a or 102b.

Rapid decompression may occur as the result of structural damage to one of compartments 102a or 102b. Releasing door module 103 from a closed position and enabling a rapid opening of door module 103 in case of a rapid loss of pressure in one of compartments 102a or 102b may prevent further damage to aircraft 100 by ensuring the establishment of equal pressure in both compartments 102a and 102b.

Figure 2A:
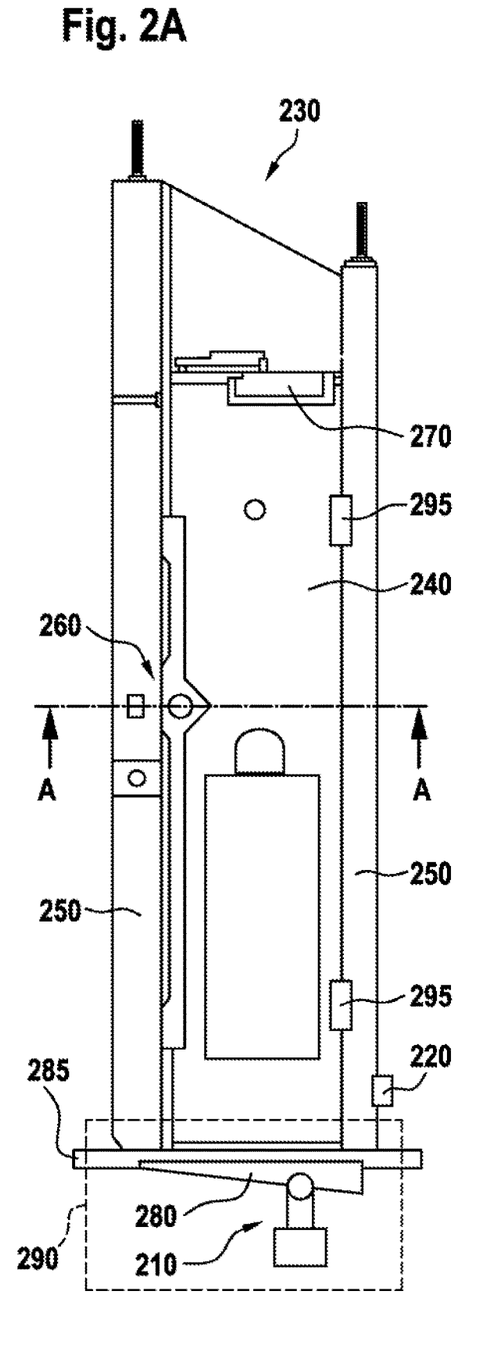
FIG. 2A is a diagram of an illustrative door module with a door system having an inactive deceleration mechanism in accordance with some embodiments.
Figure 2B:
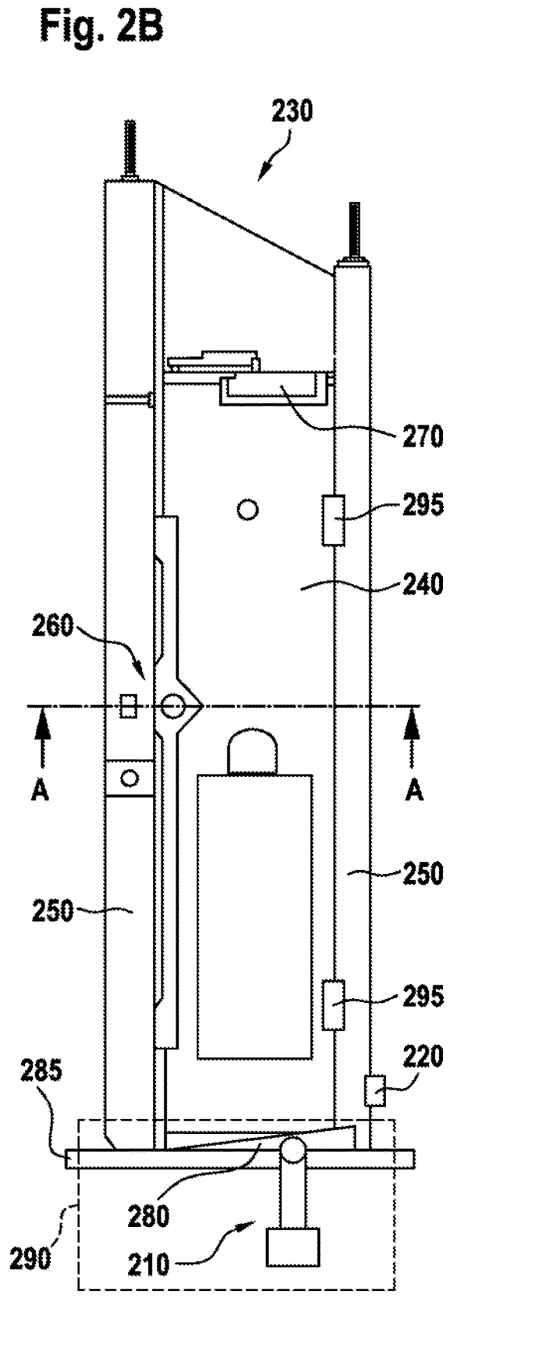
FIG. 2B is a diagram of an illustrative door module with a door system having an activated deceleration mechanism in accordance with some embodiments.
Figure 2C:
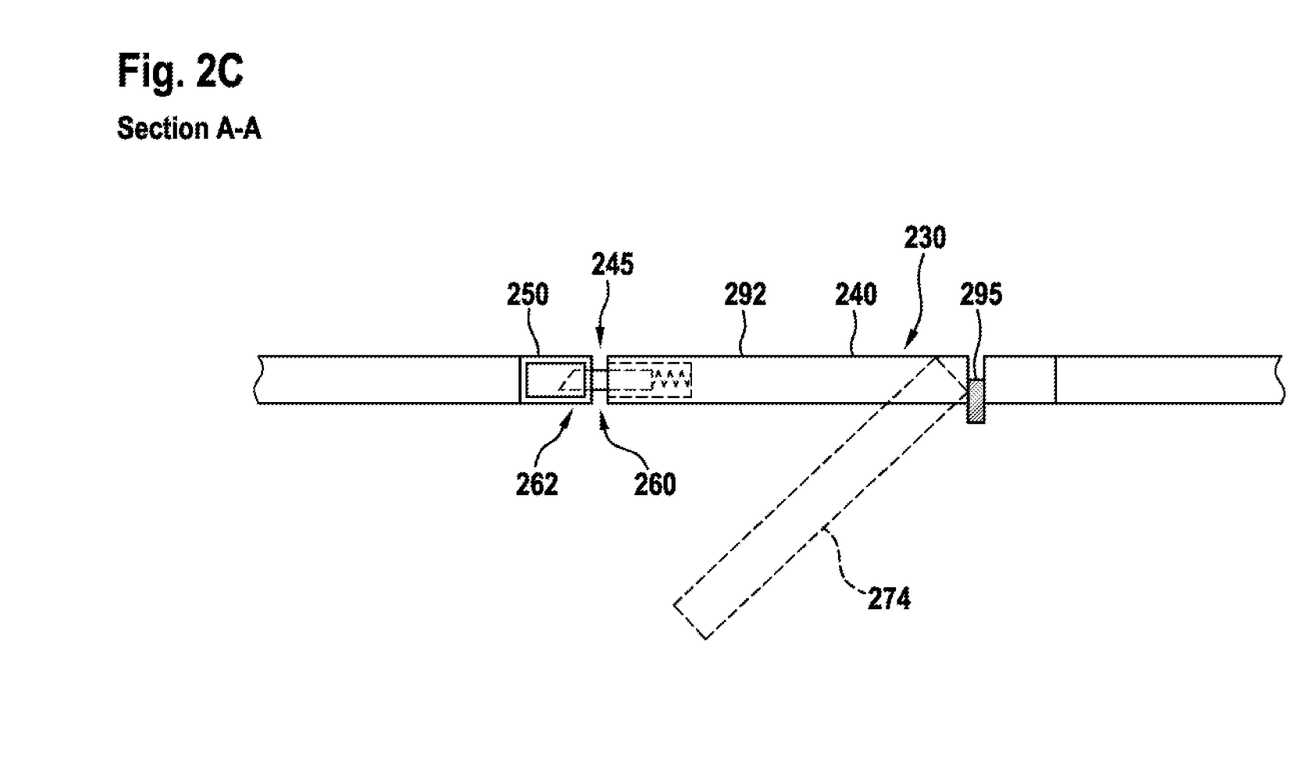
FIG. 2C is a diagram of an illustrative door module with a door locking system in accordance with some embodiments.

FIGS. 2A and 2B show illustrative door module 230 with a door system 290 having an inactive deceleration mechanism 280 and an activated deceleration mechanism 280, respectively, in accordance with some embodiments. FIG. 2C is a sectional view of door module 230 of FIGS. 2A and 2B with door locking system 260 and door release system 262.

As shown in FIG. 2A, 2B, or 2C, door module 230 may include door panel 240, which is sometimes also referred to as a door blade, door frame 250, and door damper 270. Door system 290 may include activation device 210 and deceleration mechanism 280. If desired, door system 290 may include door locking system 260 and/or a door release system 262.

Door damper 270 may bias door panel 240 into a closed position. Door damper 270 may include a compression or torsion spring that stores the energy used in the opening of door panel 240. The spring may release the stored energy to close door panel 240.

If desired, door damper 270 may allow for adjustment of the strength of the spring, making it easier or more difficult to push door panel 240 open. For limiting the speed at which door panel 240 is closed, the door damper 270 may use hydraulic (e.g., oil-filled) dampers. In some embodiments, spring mechanisms may be used for damping.

Door locking system 260 may maintain door panel 240 in the closed position. In other words, door locking system 260 may maintain door panel 240 in a position in which door panel 240 closes door frame 250, thereby denying access through door frame 250. Door locking system 260 may be arranged on door panel 240 and/or on door frame 250.

FIG. 2C shews a sectional view of illustrative door module 230 with door panel 240 in a closed position 272. As shown, door module 230 may include door panel 240, door frame 250, door locking system 260 with locking element 245, and hinges 295. In the closed position 272, door panel 240 may prevent passage through door frame 250. In some embodiments, door locking system 260 with locking element 245 may be part of door system 290.

To satisfy current safety regulations for passenger aircraft, door module 230 may be locked (i.e., door locking system 260 may maintain door panel 240 in closed position 272 in which door panel 240 closes door frame 250) as soon as the aircraft leaves the parking area and for the entire duration of the flight. Door locking system 260 may include a set of electric strikers or bolts that is installed in the side of door panel 240 (i.e., at the edge of the door or near the edge of the door).

In a locked position, these strikers or bolts are inserted in tumblers mounted in door frame 250 or in openings of door frame 250 that are adapted to receive the strikers or bolts. If desired, the strikers or bolts may be controlled electrically. More specifically, the strikers or bolts may be powered continuously to ensure that door locking system 260 maintains door panel 240 in a locked position. When the electric power supply is cut off, the strikers or bolts may slide toward an unlocked position, if desired.

In other words, locking element 245 of door locking system 260 may have at least a first and a second state. Locking element 245 may be adapted to maintain door panel 240 in closed position 272 in the first state. Locking element 245 may be adapted to release door panel 240 from closed positron 272 in the second state.

In some embodiments, locking element 245 may be located in door panel 240. In the first state, a latching element of locking element 245 may protrude from door panel 240 into door frame 250, thereby maintaining door panel 240 in closed position 272.

In some embodiments, locking element 245 may be located in door frame 250. In the first state, a latching element of locking element 245 may protrude from door frame 250 into door panel 240, thereby maintaining door panel 240 in closed position 272.

If desired, a biasing element of locking element 245 may bias the latching element into the protruding position, thereby biasing locking element 245 into the first state.

Door release system 262 may include a locking element release actuator that is coupled to locking element 245. The locking element release actuator may perform a transition of locking element 245 from the first state to a second state. The transition of locking element 245 from the first state to the second state is sometimes also referred to as the release of locking element 245.

For example, the locking element release actuator may act on the latching element and/or against the biasing element such that the latching element no longer protrudes from door panel 240 if locking element 245 is located in door panel 240 or from door frame 250 if locking element 245 is located in door frame 250.

Upon the release of locking element 245, door panel 240 may perform a rotational movement around an axis defined by hinges 295, thereby moving door panel 240 from closed position 272 to open position 274. For example, door panel 240 may be manually moved, moved by a pressure difference, or by a biasing device from closed position 272 to open position 274 upon the release of locking element 245.

In other words, door release system 262 of door system 290 may override door locking system 260 and release door panel 240 from the closed position 272. For example, door release system 262 may override door locking system 260 under predetermined conditions.

For example, door release system 262 may release door panel 240 from the closed position 272, when a difference in pressure between the compartments of an aircraft (e.g., compartments 102a, 102b of aircraft 100 of FIG. 1) exceeds a predetermined threshold. Thus, door system 290 may ensure decompression of the compartment with the higher air pressure, thereby harmonizing the air pressure between the compartments.

In some embodiments, door system 290 may ensure harmonization of the air pressure between the compartments within a predetermined time interval. Harmonization of the air pressure may be achieved by an opening of door module 230 that separates the compartments of the aircraft (e.g., compartments 102a, 102b of FIG. 1).

As shown in FIGS. 2A and 2B, hinges 295 may attach door panel 240 to door frame 250, and door panel 240 may perform a rotational movement above floor structure 285 of the aircraft and around an axis defined by hinges 295 during the opening of door module 230.

As an example, consider the scenario in which door module 230 separates a cockpit of an aircraft from a cabin of the aircraft. In other words, the compartments (e.g., compartments 102a and 102b of aircraft 100 of FIG. 1) are embodied by cockpit and cabin, respectively. In this scenario, door panel 240 may be placed perpendicular to floor structure 285 of the aircraft. Door panel 240 may be mounted on door frame 250 by hinges 295 that are aligned along an axis perpendicular to the surface of floor structure 285. In some embodiments, the hinges 295 may be located on the cockpit side of door panel 240 so that the hinges 295 are inaccessible from the cabin. Door module 230 may have no gaps between door panel 240 and door frame 250, if desired.

In some embodiments, door panel 240 and door frame 250 may allow the opening of door panel 240 toward the cockpit. It is understood that door panel 240 may be mounted on door frame 250 in a different way. As an example, the hinges 295 may be located on the cabin side of door panel 240 and/or door panel 240 may open towards the cabin.

If desired, door system 290 may be adapted to control the opening of door module 240 undex predetermined conditions. For example, door system 290 may control the opening of door module 240 if a predetermined air pressure difference threshold between the compartments is exceeded.

Such a predetermined air pressure difference may be based in structural specifications of the aircraft and/or on regulations.

Deceleration mechanism 280 of door system 290 may include a hinge and a wedge-shaped component that is rotatably attached to the hinge. FIG. 2A shows deceleration mechanism 280 operated in a normal mode. When operated in the normal mode, the wedge-shaped component is embedded floor structure 285 to prevent an interaction with door panel 240 when door panel 240 performs the rotational movement from the closed to any open position.

When difference in pressure between the compartments that are separated by door module 230 exceeds a predetermined threshold, activation device 210 of door system 290 that is coupled to the wedge-shaped component of deceleration mechanism 280 may switch the deceleration mechanism 280 from operating in the normal operation mode to operating in the deceleration mode.

For example, as shown in FIG. 2B, activation device 210 may push the wedge-shaped component upwards such that the wedge-shaped component protrudes from the floor structure 285 and interacts with the door panel 240 such that the rotational movement of the door panel 240 is decelerated at least between a first open position and a second open position.

In some embodiments, door module 230 may include a mechanical end stop 220. As an example, mechanical end stop 220 may be attached to door frame 250. If desired, mechanical end stop 220 may be attached to any other surface that enables mechanical end stop 220 to limit the opening of door panel 240. For example, mechanical end stop 220 may be attached to a wall next to door frame 250.

Figure 3A:
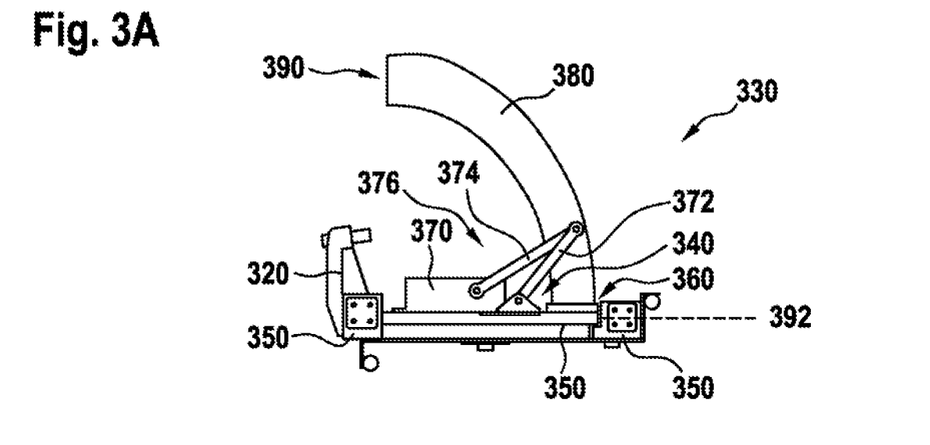
FIG. 3A is a diagram of an illustrative door module that includes a door panel in a closed position and a door system with a deceleration mechanism in accordance with some embodiments.
Figure 3B:
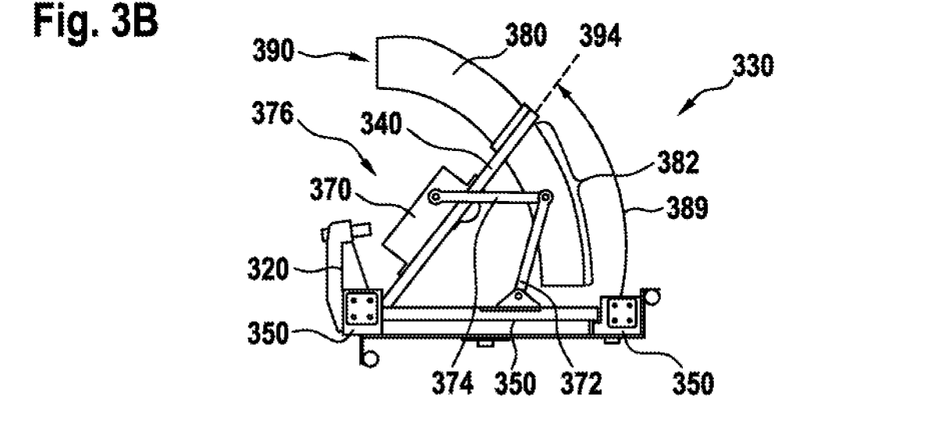
FIG. 3B is a diagram of an illustrative door module that includes a door panel in a first open position and a door system with a deceleration mechanism in accordance with some embodiments.
Figure 3C:
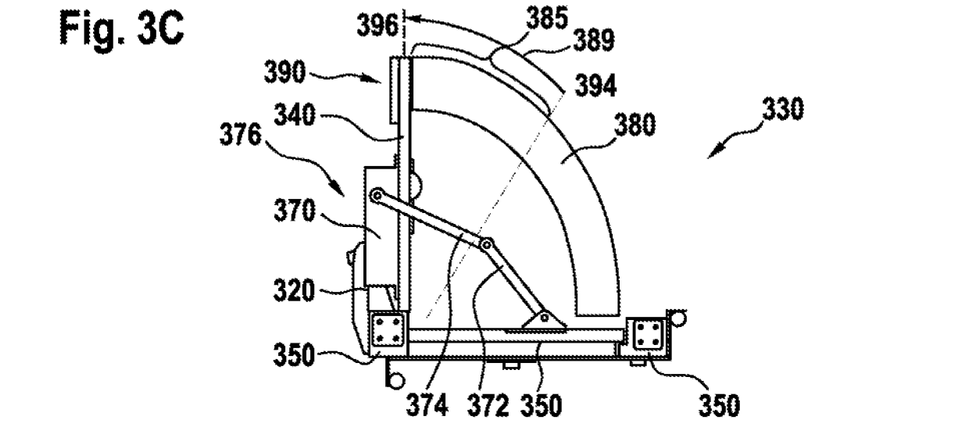
FIG. 3C is a diagram of an illustrative door module that includes a door panel in a second open position and a door system with a deceleration mechanism in accordance with some embodiments.

FIGS. 3A, 3B, and 3C illustrate door module 330 with door panel 340 in closed position 392, in first predetermined open position 394, and in second predetermined open position 396, respectively. As shown in FIGS. 3A, 3B, and 3C, door module 330 may include door panel. 340, door frame 350, door system 390, door closer 376, mechanical end stop 320, and door locking system 360.

Door frame 350 and door panel 340 may be arranged perpendicular to the floor structure and/or the ceiling structure. Door panel 340 may be mounted on door frame 350 by hinges that are aligned along an axis perpendicular to the surface of the floor structure. During an opening of door module 330, door panel 340 may perform a rotational movement 389 around the axis defined by the hinges.

Door locking system 360 may be arranged on door panel 340. If desired, door locking system 360 may be arranged on door frame 350. As shown, mechanical end stop 320 may be attached to door frame 350. If desired, mechanical and stop 320 may be attached to any other surface that enables mechanical end stop 320 to limit the opening of door panel 340. As an example, mechanical end stop 320 may be attached to a compartment wall next to door frame 350.

Door closer 376 may bias door panel 340 into closed position 392. As shown, door closer 376 may include door damper 370 and first and second pivot arms 372, 374. Door damper 370 may be coupled to door panel 340. In some embodiments, door damper 370 may include one or more deformation or friction elements such as a spring, a piston, a hydraulic channel and/or a valve that regulates the closing movement.

Door damper 370 may be mounted to door panel 340. Pivot arm 372 may be coupled to door frame 350, and pivot arm 374 may be coupled between pivot arm 372 and door damper 370. As another example, door damper 370 may be mounted to door frame 350. Pivot arm 372 may be coupled to door panel 340, and pivot arm 374 may be coupled between pivot arm 372 and door damper 370.

Pivot arm 372 and pivot arm 374 may be attached to each other by means of hinges to form a vertical pivot axis for door panel 340. Pivot arms 372, 374 may pivot relative to each other like scissors as door panel 340 performs a rotational movement, their relative angle roughly following the angle of door panel 340 relative to door frame 350.

Door system 390 may include deceleration mechanism 380 that is operable in a normal operation mode and a deceleration mode. Deceleration mechanism 380 may include a hinge, a wedge-shaped component that is rotatably attached to the hinge, and an activation device.

The cross-sectional view of the wedge-shaped component seen from above or from below (i.e., parallel to the longitudinal extension of door panel 340) may have any shape. For example, the cross-sectional view of the wedge-shaped component seen from above or from below may have the shape of a polygon, a segment of a polygon, or a disc segment. If desired, the cross-sectional view of the wedge-shaped component seen from above or from below may have the shape of an arc or any other portion of the disc segment.

The disc segment or the arc may encompass a predetermined angle. The angle may depend on the opening angle of door panel 340 between closed position 392 and the fully open position. As an example, the angle may be 180° (i.e., the disc segment may be a half disc or the arc may span 180°). As another example, the angle may be between 90° (i.e., the disc segment may be a quarter disc or the arc may span 90°).

The wedge-shaped component may be installed in the floor structure above which door panel 340 performs a rotational movement 389 around the axis defined by the hinges to which door panel 340 is attached. In some embodiments, the wedge-shaped component may be installed in the ceiling below which door panel 340 performs a rotational movement 389 around the axis defined by the hinges to which door panel 340 is attached. If desired, a first wedge-shaped component may be installed in the floor structure above and a second wedge-shaped component in the ceiling below which door panel 340 performs a rotational movement 389 around the axis defined by the hinges to which door panel 340 is attached.

The activation device may be coupled to the wedge-shaped component. The activation device may switch the deceleration mechanism 380 from operating in the normal operation mode to operating in the deceleration mode under predetermined conditions. For example, the activation device may switch the deceleration mechanism 380 from operating in the normal operation mode to operating in the deceleration mode when a difference in pressure between the compartments that are separated by door module 330 exceeds a predetermined threshold.

In the normal operation mode, the wedge-shaped component may be embedded in the floor structure and/or in the ceiling to prevent an interaction with door panel 340. In the deceleration mode, the wedge-shaped component may protrude from the floor structure and/or the ceiling to interact with door panel 340 such that the rotational movement 389 of door panel 340 is decelerated at least between first 394 and second open positions 396.

As an example of the normal operation mode, consider the scenario in which door module 330 is opened slowly. For example, a person may open door module 330 by unlocking door locking system 360 and moving door panel 340 from the closed position to any open position (e.g., open position 394 or open position 396).

In this scenario, the activation device may remain inactive and deceleration mechanism 380 may remain in the normal operation mode. In other words, the wedge-shaped component of deceleration mechanism 380 may remain embedded in the floor structure and/or in the ceiling.

As an example of the deceleration mode, consider the scenario in which the air pressure difference between compartments (e.g., compartments 102a, 102b of FIG. 1) that are separated by door module 330 need to be equalized rapidly (e.g., when a predetermined air pressure difference threshold between compartments 102a and 102b is exceeded). For example, a pressure sensor system may monitor a pressure in at least one of the compartments. If desired, door system 390 may include one or more of such pressure sensors.

In some embodiments, a controller may be coupled to the pressure sensor. The controller may monitor the difference pressure between the compartments and generate an activation signal when the difference in pressure between the compartments exceeds a predetermined threshold. If desired, the controller may generate the activation signal based on signals received from the pressure sensor.

In this scenario, a door release system may override door locking system 360 (e.g., door release system 262 of FIG. 2), thereby releasing door panel 340 from the closed position 392. If desired, the activation device that is coupled to the wedge-shaped component may switch deceleration mechanism 380 from operating in the normal operation mode to operating in the deceleration mode. As a result, the wedge-shaped component may protrude from the floor structure and/or the ceiling such that the wedge-shaped component interacts with door panel 340.

In response to the difference in pressure, door panel 340 may rapidly perform a rotational movement 389 from closed position 392 to first predetermined open position 394. During the move of door panel 340 from closed position 392 to the first predetermined open position 394, door panel 340 may have a comparatively high kinetic energy, which may be based on the air pressure difference between the compartments. During the move of door panel 340 from the closed position 392 to the first predetermined open position 394, deceleration mechanism. 380 of door system. 390 may absorb a portion of the kinetic energy of door panel 340.

According to some embodiments, the friction between door panel 340 and deceleration mechanism 380 in segment 382 of the wedge-shaped component may be neglected during the rotational movement 389 of door panel 340 from the closed position 392 to the first predetermined open position 394. In other words, door panel 340 may open rapidly with almost no deceleration when door panel 340 moves from the closed position 392 to the first predetermined open position 394 (see FIG. 3B).

During the move of door panel 340 from the first 394 to the second predetermined open position 396, deceleration mechanism 380 of door system 390 may absorb another portion of the kinetic energy of door panel 340.

In the second predetermined open position 396, the kinetic energy of door panel 340 may be non-zero. Mechanical end stop 320 may absorb another portion (e.g., the remainder) of the kinetic energy that door panel 340 may have at the second predetermined open position 396.

According to some embodiments, segment 385 of the wedge-shaped component may absorb most of the kinetic energy of door panel 340 during the rotational movement 389 of door panel 340 from the first 394 to the second predetermined open position 396. In other words, the kinetic energy absorbed by segment 385 is greater than the kinetic energy absorbed by segment 382.

If desired, segment 385 may have a surface shape and/or contour that is adapted to decelerate the rotational movement of door panel 340. For example, segment 3585 and/or the surface of segment 385 may include structural parts that reduce the velocity of (i.e., negatively accelerate or decelerate) the rotational movement of door panel 340.

The structural parts may include parts that deform plastically. Such structural parts may include any parts that elongate, compress, buckle, or bend. As another example, the structural parts may include parts that transform the kinetic energy of the door panel 340 into heat (e.g., through friction) such as brakes. If desired, the braking mechanism may include a combination of structural parts that deform plastically and structural parts that transform kinetic energy into heat.

Figure 4A:
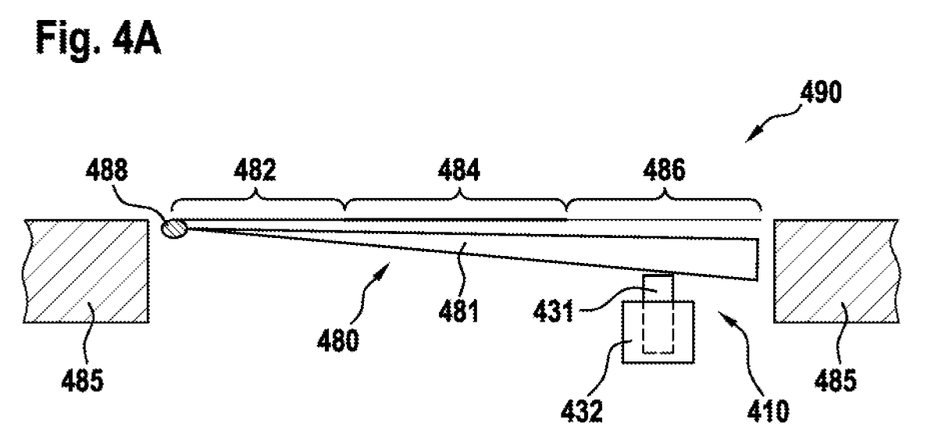
FIG. 4A is a diagram of an illustrative inactive deceleration mechanism in accordance with some embodiments.
Figure 4B:
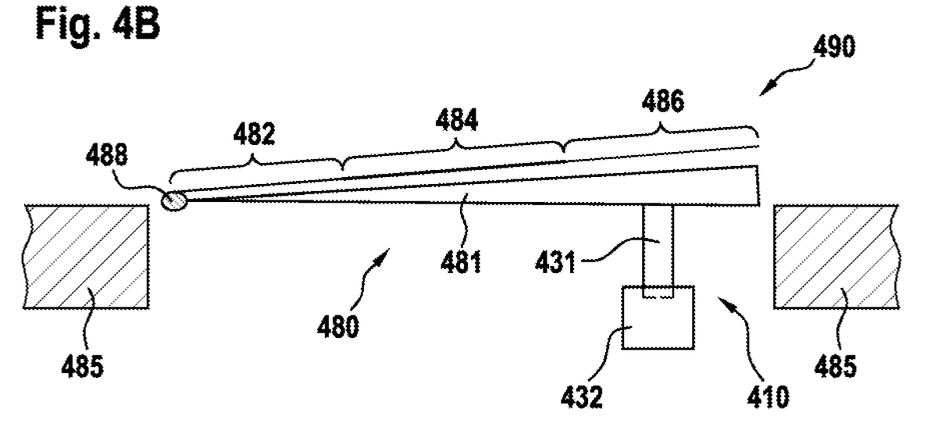
FIG. 4B is a diagram of an illustrative active deceleration mechanism in accordance with some embodiments.

FIGS. 4A and 4B show an inactive deceleration mechanism 480 (i.e., a deceleration mechanism operating in normal operation mode) and an activated deceleration mechanism 480 (i.e., a deceleration mechanism operating in deceleration mode) of door system 490, respectively.

Door system 490 may be adapted to control an opening of a door module that includes a door panel and a door frame. The door panel may be attached to the door frame with hinges. Thus, during an opening of the door module, the door panel may perform a rotational movement around an axis defined by the hinges.

As shown, deceleration mechanism 480 may include hinge 488 and wedge-shaped component 481 that is rotatably attached to hinge 488.

Wedge-shaped component 481 may be installed in the floor structure 485 at a location above which the door panel performs the rotational movement. In some embodiments, the wedge-shaped component 481 may be installed in the ceiling below which the door panel performs the rotational movement. If desired, a first wedge-shaped component 481 may be installed in the floor structure 485 and a second we component 481 in the ceiling.

In the normal operation mode, wedge-shaped component 481 may be embedded in the floor structure 485 and/or in the ceiling to prevent an interaction with the door panel. In the deceleration mode, wedge-shaped component 481 may protrude from the floor structure 485 and/or the ceiling to interact with the door panel such that the rotational movement of the door panel is decelerated at least between first and second open positions.

Wedge-shaped component 481 may have different surface shapes and/or surface materials based on the segment and on the desirable deceleration the rotational movement of the door panel. As an example, wedge-shaped component 481 may have three segments 483, 484, and 486 that differ from each other in the surface shape and/or the surface material and/or in the height of protrusion from the floor structure 485 and/or the ceiling.

For example, during a rapid decompression of one of the two compartments that are separated by the door module, the door panel initially needs to be free to move into a first open position (e.g., first predetermined open position 394 of FIG. 3B) to achieve the needed venting area and to ensure a predetermined reduction of the difference in pressure between the compartments within a predetermined time period.

Thus, segment 483 may have a smooth surface and/or the height of protrusion from the floor structure 485 may be comparatively small to limit interaction of wedge-shaped component 481 with the door panel and thereby achieve comparative little deceleration of the rotational movement of the door panel.

In some embodiments, segment 483 may be partially or completely omitted. As a result, hinge 488 and wedge-shaped component 481 may be attached with each other closer to or at segment 484.

After the predetermined reduction of the difference in pressure between the compartments within the predetermined time period (e.g., associated d with the rotational movement of the door panel from the closed position to the first open position), the velocity of the rotational movement of the door panel should be gradually reduced to zero or almost zero (e.g., to prevent the door panel from crashing into another structure of the aircraft).

Segments 484 and 486 of wedge-shaped component 481 may interact with the door panel such that the rotational movement of the door panel is decelerated at least between the first open position and the second open position (e.g., between first and second predetermined open positions 394 and 396 of FIG. 3C).

Segments 484 and 486 may interact with the lower edge of the door panel if wedge-shaped component 481 is embedded in floor structure 485. Segments 484 and 486 may interact with the upper edge of the door panel if wedge-shaped component 481 is embedded in the ceiling.

Segments 484 and 486 may be provided with different surfaces and/or geometries and/or different contact pressure and stiffness that segment 482. For example, segments 484 and/or 486 may have at least one of a wave-shaped or concave-shaped surface that interacts with the door panel such that the velocity of the rotational movement of the door panel is reduced.

The surface of segments 484 and/or 486 may be made from materials that include one, or more materials of high resilience such as elastomers, steel, composite materials, etc. As another example, the surface of segments 484 and/or 486 may include materials of a high plasticity such as soft thermoplastics and/or metals such as steel, tempered iron, copper, etc. In some embodiments, the surface of segments 484 and/or 486 may be made from materials of both, high elasticity and high plasticity.

The height of the protrusion of segments 484 and 486 from floor structure 485 and/or the ceiling may be bigger than the height of the protrusion of segment 483 from floor structure 485 and/or the ceiling to increase the interaction of wedge-shaped component 481 with the door panel and thereby achieve comparatively high deceleration of the rotational movement of the door panel.

In some embodiments, the height of the protrusion of segments 484 and 486 may depend on activation device 410. Activation device 410 may be coupled to wedge-shaped component 481. Activation device 410 may switch the deceleration mechanism 480 from operating in the normal operation mode shown in FIG. 4A to operating in the deceleration mode shown in FIG. 4B under predetermined conditions.

For example, activation device 410 may switch the deceleration mechanism 480 from operating in the normal operation mode to operating in the deceleration mode when a difference in pressure between the compartments that are separated by the door module exceeds a predetermined threshold.

Activation device 410 may include movable pin 431 and movable pin actuator 432. As shown in FIG. 4A, movable pin 431 may be retracted inside movable pin actuator 432 when deceleration mechanism 480 is operating in the normal operation mode. As shown in FIG. 4B, movable pin actuator 432 may push movable pin 431 against wedge-shaped component 481 such that movable pin 431 protrudes from movable pin actuator 432 when deceleration mechanism 480 is operating in the deceleration mode. Illustrative activation devices in accordance with some embodiments are shown in FIGS. 5A and 5B.

Figure 5A:
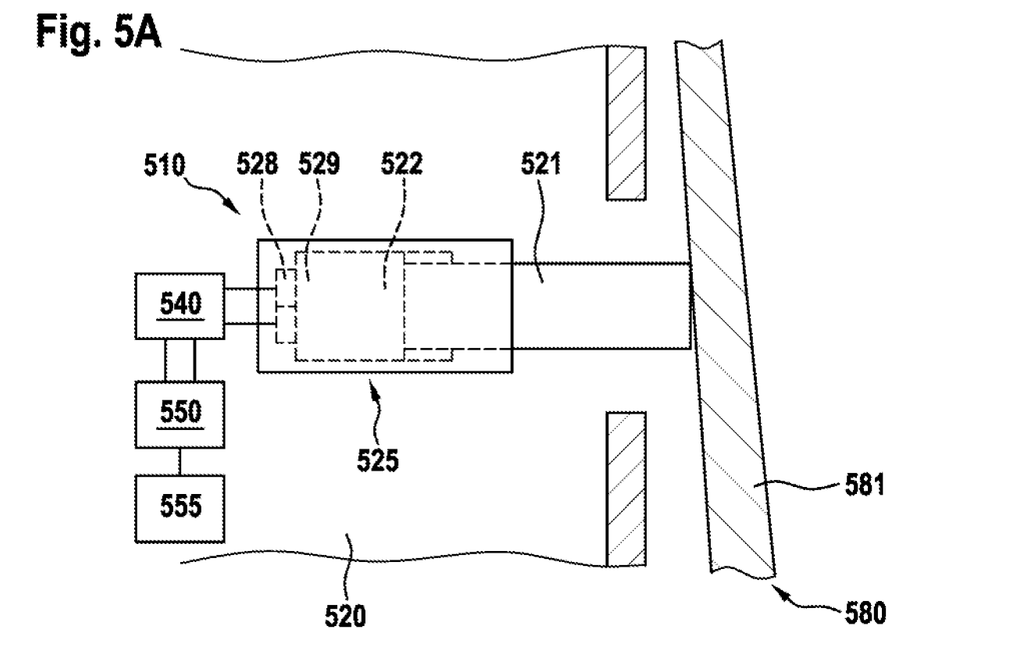
FIG. 5A is a diagram of an illustrative activation device with a pyrotechnical device in accordance with some embodiments.
Figure 5B:
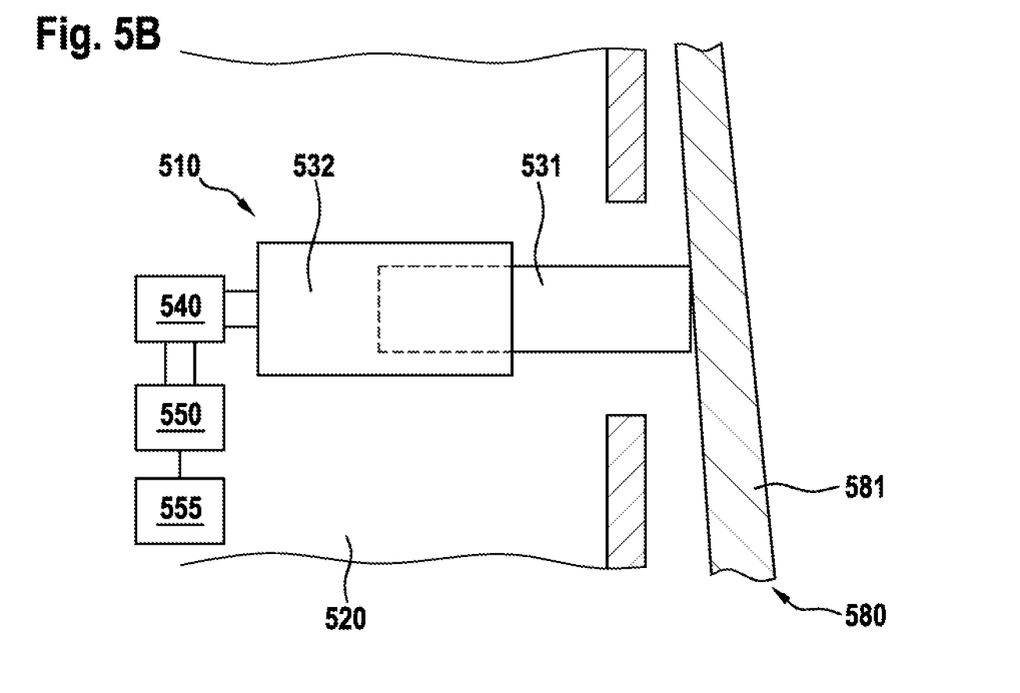
FIG. 5B is a diagram of an illustrative activation device with a solenoid bolt in accordance with some embodiments.

FIG. 5A is a diagram of illustrative activation device 510 with a pyrotechnical device. As shown in FIG. 5A, activation device 510 may be located floor structure 520 and/or the ceiling. Activation device 510 may be coupled wedge-shaped component 581 of deceleration mechanism 580.

As shown in FIG. 5A, activation device 510 may include movable pin 521, pyrotechnical device 525, electrically controlled switch 540, and controller 550. In some embodiments, pyrotechnical device 525 may include movable pin actuator 522, ignition unit 528, and gas generator 529.

FIG. 5A shows movable pin 521 protruding from pyrotechnical device 525. In other words, FIG. 5A shows activation device 519 when deceleration mechanism 580 is operating in the deceleration mode and movable pin 521 has pushed against wedge-shaped component 581 such that wedge-shaped component 581 protrudes from floor structure 520 and/or the ceiling.

Consider the scenario in which controller 550 has detected the occurrence of an emergency. For example, pressure sensor 555 may monitor a pressure in at least one of the compartments (e.g., compartments 102a, 102b of aircraft 100 of FIG. 1) that are separated by a door module, and controller 550 that is coupled to pressure sensor 555 may monitor the difference in pressure between the compartments. If desired, controller 550 may generate an activation signal when the difference in pressure between the compartments exceeds a predetermined threshold.

Consider further that controller 550 has detected, based on the data from pressure sensor 555, that a difference in pressure between the compartments exceeds a predetermined threshold. In this scenario, controller 550 may direct (e.g., based on the activation signal) electrically controlled switch 540 to initiate activation of deceleration mechanism 580.

For example, electrically controlled switch 540 may send an electrical signal to ignition unit 528. Upon receipt of the signal from electrically controlled switch 540, ignition unit 528 may transform the electrical energy of the signal into a thermal energy by a chemical reaction. This thermal energy may start a secondary reaction in the adjacent gas generator 529.

Pyrotechnical device 525 may be designed such that the rate of the gas deployment is extremely high so that movable pin 521 will be pushed into the extracted position, as shown in FIG. 5A. The projection of movable pin 521 may push against deceleration mechanism 580. For example, the projection of movable pin 521 may push against wedge-shaped component 581 such that deceleration mechanism 580 switches from operating in the normal operation mode to operating in the deceleration mode.

In other words, movable pin 521 may push wedge-shaped component 581 upwards from floor structure 520 and/or downwards from the ceiling such that wedge-shaped component 581 protrudes from floor structure 520 and/or the ceiling and interacts with the door panel during an opening of the door module.

FIG. 5B is a diagram of an illustrative activation device with a solenoid bolt in accordance with some embodiments.

As shown in FIG. 5B, activation device 510 may be located in floor structure 520 and/or the ceiling. Activation device 510 may be coupled to wedge-shaped component 581 of deceleration mechanism 580.

As shown in FIG. 5B, activation device 510 may include movable pin 531, solenoid 532, electrically controlled switch 540, and controller 550. Movable pin 531 may be in a retracted position inside of solenoid 532 in the normal operation mode of deceleration mechanism 580 and it may be deployed from solenoid 532 in the deceleration mode of deceleration mechanism 580.

Consider the scenario in which controller 550 has detected the occurrence of an emergency. For example, pressure sensor may monitor a pressure in at least one of the compartments (e.g., compartments 102a, 102b of aircraft 100 of FIG. 1) that are separated by a door module, and controller 550 that is coupled to pressure sensor 555 may monitor the difference in pressure between the compartments. If desired, controller 550 may generate an activation signal when the difference in pressure between the compartments exceeds a predetermined threshold.

Consider further that controller 550 has detected, based on the data from pressure sensor 555, that a difference in pressure between the compartments exceeds a predetermined threshold. In this scenario controller 550 may direct (e.g., based on the activation signal) electrically controlled switch 540 to initiate activation of deceleration mechanism 580.

For example, electrical controlled switch 540 may turn on an electrical current through solenoid 532. In response to a current flowing through solenoid 532, solenoid 532 may generate a magnetic field inside of solenoid 532. In response to the magnetic field, movable pin 531 may move from a retracted into a protruding position.

Thus, solenoid 532 may push movable pin 531 against deceleration mechanism 580. For example, the projection of movable pin 531 may push against wedge-shaped component 581 such that deceleration mechanism 580 switches from operating in the normal operation mode to operating in the deceleration mode.

In other words, movable pin 531 may push wedge-shaped component 581 upwards from floor structure 520 and/or downwards from the ceiling such that wedge-shaped component 581 protrudes from floor structure 520 and/or the ceiling and interacts with the door panel during an opening of the door module.

Figure 6:
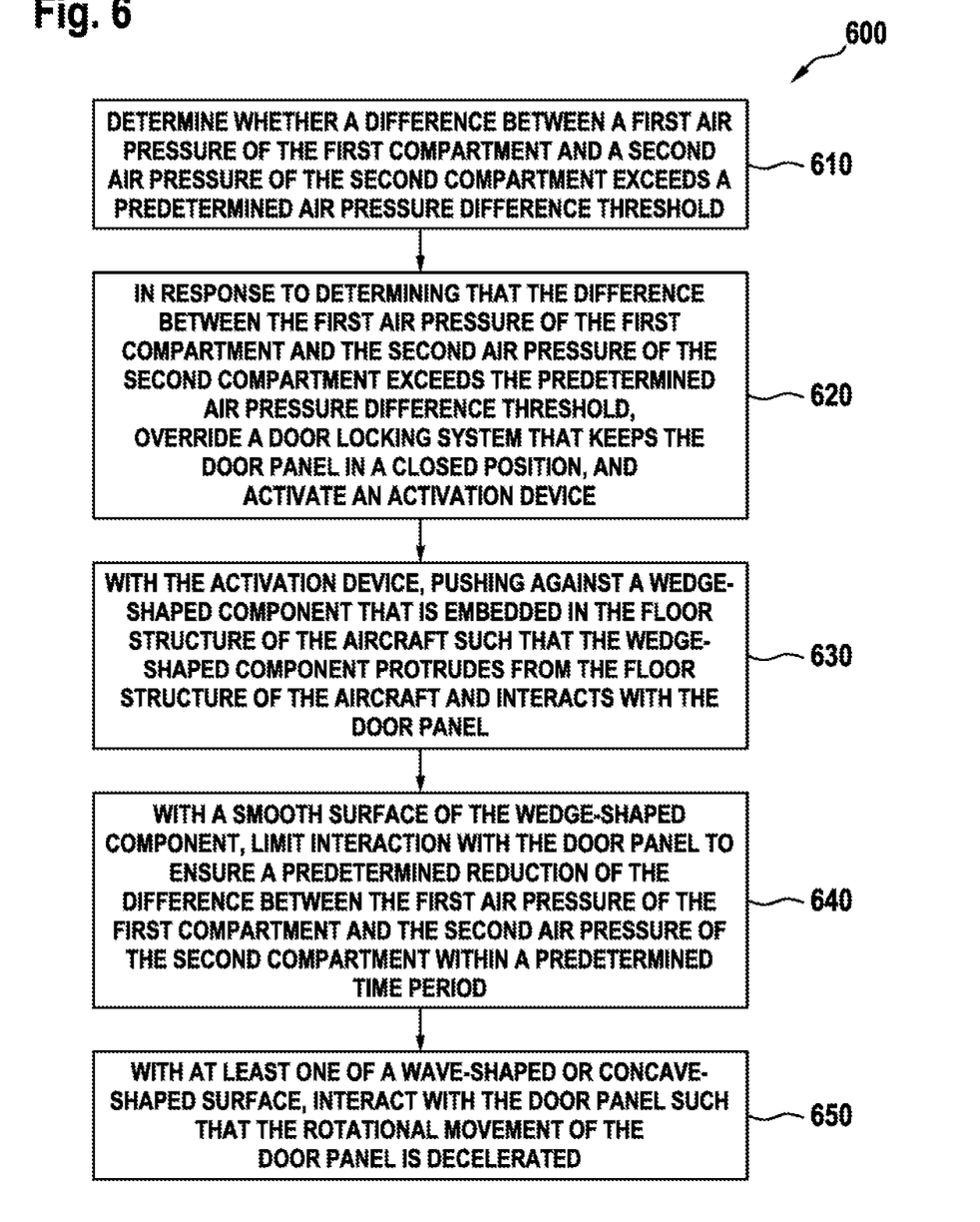
FIG. 6 is a diagram of a flowchart showing illustrative operations for controlling an opening of a door module using a door system in accordance with some embodiments.

FIG. 6 is a flowchart 20 showing illustrative operations for controlling an opening of a door module using a door system (e.g., door system 290 of FIG. 2, door system 390 of FIG. 3, or door system 490 of FIG. 4) in accordance with some embodiments. The door module may separate first and second compartments of an aircraft (e.g., door module 103 of FIG. 3 that separates compartments 102a, 102b of aircraft 100 of FIG. 1) and comprise a door panel and a door frame (e.g., door panel 240 and door frame. 250 of FIG. 2). The door panel may perform a rotational movement above a floor structure of the aircraft during an opening of the door module.

During operation 610, the door system may determine whether a difference between a first air pressure of the first compartment and a second air pressure of the second compartment exceeds a predetermined air pressure difference threshold.

For example, door module 230 of FIG. 2 may separate a cabin from a cockpit or any two other compartments of an aircraft. Door system 290 may include a pressure sensor in each of the compartments and a controller that is coupled to the pressure sensors. The controller may monitor the difference between the air pressure in the first compartment and the air pressure in the second compartment, as an example.

In response to determining that the difference between the first air pressure of the first compartment and the second air pressure of the second compartment exceeds the predetermined air pressure difference threshold, the door system may override a door locking system that keeps the door panel in a closed position, and activate an activation device during operation 620.

For example, door system 290 of FIG. 2 may override door locking system 260 that keeps door panel 240 in a closed position and activate activation device 210. As an example, controller 550 of FIG. 5 may receive a signal from pressure sensor 555 and eventually another signal from another pressure sensor. Based on the signals received, controller 550 may activate activation device 510 that is coupled to wedge-shaped component 581. If desired, door system 230 may have an additional activation device similar to activation device 510 of which the movable pin 521, 531, upon activation, pushes against a latching element of the door locking system such as to override the door locking system.

During operation 530, the door system may, with the activation device, push against a wedge-shaped component that is embedded in the floor structure of the aircraft such that the wedge-shaped component protrudes from the floor structure of the aircraft and interacts with the door panel.

For example, door system 290 of FIG. 2 may be integrated into floor structure 285 of an aircraft and push with activation device 210 against the wedge-shaped component that is embedded in the floor structure 285 such that the wedge-shaped component protrudes from the floor structure 285 and interacts with the door panel 240.

With a smooth surface of the wedge-shaped component, the door system may limit interaction with the door panel to ensure a predetermined reduction of the difference between the first air pressure of the first compartment and the second air pressure of the second compartment within a predetermined time period during operation 640.

For example, during a first portion of the rotational movement of the door panel from the closed position to a first predetermined open position (e.g., rotational movement 382 of door panel 340 from closed position 392 to first predetermined open position 394 of FIG. 3), door system 490 of FIG. 4 may, with smooth surface 482 of wedge-shaped component 481, limit interaction with the door panel to ensure a predetermined reduction of the difference between the first air pressure of the first compartment and the second air pressure of the second compartment within a predetermined time period.

During operation 650, the door system may interact with at least one of a wave-shaped or concave-shaped surface with the door panel such that the rotational movement of the door panel is decelerated.

For example, during a second portion of the rotational movement of the door panel from the first predetermined open position to a second predetermined open position (e.g., rotational movement 38) of door panel 340 from first predetermined open position 394 to second predetermined open position 396 of FIG. 3), door system 490 of FIG. 4 may, with wave-shaped surface 484 and/or concave-shaped surface 486 of wedge-shaped component 481, interact with the door panel such that the rotational movement of the door panel is decelerated.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, deceleration mechanism 490 of FIG. 4 is shown with three different segments 482, 484, and 486 having one or more different surfaces. However, deceleration mechanism 490 of FIG. 4 may have any number of segments with one or more surfaces. For example, deceleration mechanism 490 may have a single segment having a uniform surface structure and material. In other words, the deceleration of the rotational movement of the door panel may only depend on the height of protrusion of wedge-shaped component 481 from floor structure 485. If desired, the edge of the door panel that interacts with wedge-shaped component 481 may have a predetermined surface material that provides predetermined characteristics for interacting with wedge-shaped component 481.

As another example, activation device 210 of FIG. 2 or 410 of FIG. 4 is shown with a movable pin 431 that pushes against deceleration mechanism 490. However, activation device 210 or 410 may be any device that allows to move wedge-shaped component 481 from a normal operation mode in which wedge-shaped component 481 is embedded in floor structure 485 to a deceleration mode in which wedge-shaped component 481 protrudes from floor structure 485. If desired, the activation device may pull wedge-shaped component 481 instead of push wedge-shaped component 481.

REFERENCE LIST 100 aircraft
102 fuselage
102a, 102b compartments
103 door module
185 floor structure
210 activation device
220 mechanical end stop
230 door module
240 door panel
245 locking element
250 door frame
260 door locking system
262 door release system
270 door damper
272 closed position
274 open position
280 deceleration mechanism
285 floor structure
290 door system
292 closed position
294 open position
295 hinge
320 mechanical end stop
330 door module
340 door panel
350 door frame
350 door locking system
370 door damper
372, 374 pivot arm
376 door closer
380 deceleration mechanism
382, 385 segment
389 rotational movement
390 door system
392 closed position
394, 396 predetermined open position
410 activation device
431 movable pin
432 movable pin actuator
480 deceleration mechanism
481 wedge-shaped component
482 segment
484 segment
485 floor structure
486 segment
488 hinge
490 door system
510 activation device
520 floor structure
521 movable pin
522 movable pin actuator
525 pyrotechnical device
528 ignition unit
529 gas generator
531 movable pin
532 solenoid
540 electrically controlled switch
550 controller
555 pressure sensor
580 deceleration mechanism
581 wedge-shaped component
585 floor
500 flowchart
610, 620, 630, 640, 650 operation

What is claimed is:

1. A door system adapted to control an opening of a door module that separates compartments of an aircraft, the door module comprising a door panel and a door frame, wherein the door panel performs a rotational movement above is floor structure of the aircraft during an opening of the door module, the door system comprising:
   a deceleration mechanism that is operable in a normal operation mode and a deceleration mode and comprises:
      a hinge, and
      a wedge-shaped component that is rotatably attached to the hinge, wherein during the rotational movement of the door panel from a closed position to any open position:
         the wedge-shaped component is embedded in the floor structure of the aircraft to prevent an interaction with the door panel in the normal operation mode, and
         the wedge-shaped component protrudes from the floor structure of the aircraft and interacts with the door panel such that the rotational movement of the door panel is decelerated at least between a first open position and a second open position in the deceleration mode; and
      an activation device that is coupled to the wedge-shaped component and that switches the deceleration mechanism from operating in the normal operation mode to operating in the deceleration mode when a difference in pressure between the compartments exceeds a predetermined threshold.

2. The door system of claim 1, wherein the door module further comprises:
   a door closer that biases the door panel into the closed position.

3. The door system of claim 2, wherein the door closer further comprises:
   a door damper that coupled to the door panel;
   a first pivot arm that is coupled to the door frame; and a second pivot arm that is coupled between the first pivot arm and the door damper.

4. The door system of claim 1, further comprising:
a pressure sensor that monitors a pressure in at least one of the compartments; and
a controller that is coupled to the pressure sensor, monitors the difference in pressure between the compartments of the aircraft, and generates an activation signal when the difference in pressure between the compartments exceeds the predetermined threshold.

5. The door system of claim 4, wherein the activation device receives the activation signal from the controller and switches the deceleration mechanism from operating the normal operation mode to operating in the deceleration mode based on the activation signal.

6. The door system of claim 4, further comprising:
a door locking system that maintains the door panel in the closed position.

7. The door system of claim 6, further comprising:
a door release system that overrides the door locking system and releases the door panel from the closed position when the difference in pressure between the compartments exceeds the predetermined threshold.

8. The door system of claim 7, wherein the door release system overrides the door locking system based on the activation signal from the controller.

9. The door system of claim 1, wherein the wedge-shaped component further comprises:
a first segment that interacts with the door panel between the closed position and the first open position in the deceleration mode; and
a second segment that interacts with the door panel between the first open position and the second open position in the deceleration mode.

10. The door system of claim 9, wherein the first segment further comprises:
a smooth surface that limits interaction with the door panel to ensure a predetermined reduction of the difference in pressure between the compartments within a predetermined time period.

11. The door system of claim 9, wherein the second segment further comprises:
at least one of a wave-shaped or concave-shaped surface that interacts with the door panel such that the rotational movement of the door panel is decelerated.

12. The door system of claim 1, wherein the activation device further comprises:
a movable pin that pushes against the deceleration mechanism; and
at least one of solenoid or a pyrotechnical device, wherein the at least one of the solenoid or the pyrotechnical device pushes the movable pin against the wedge-shaped component such that the deceleration mechanism switches from operating in the normal operation mode to operating in the deceleration mode.

13. The door system of claim 1, wherein the deceleration mechanism further comprises:
a mechanical end stop that stops the door panel at the second open position of the door panel.

14. The doer system of claim 13, wherein the mechanical end stop is attached to the door frame.

15. A method for controlling an opening of a door module using the door system of claim 1, wherein the door module separates first and second compartments of an aircraft and comprises a door panel and a door frame, wherein the door panel performs a rotational movement above a floor structure of the aircraft during an opening of the door module, the method comprising:
determining whether a difference between a first air pressure of the first compartment and a second air pressure of the second compartment exceeds a predetermined air pressure difference threshold;
in response to determining that the difference between the first air pressure of the first compartment and the second air pressure of the second compartment exceeds the predetermined air pressure difference threshold,
overriding a door locking system that keeps the door panel in a closed position, and activating an activation device;
with the activation device, pushing against a wedge-shaped component that is embedded in the floor structure of the aircraft such that the wedge-shaped component protrudes from the floor structure of the aircraft and interacts with the door panel;
with a smooth surface of the wedge-shaped component, limiting interaction with the door panel to ensure a predetermined reduction of the difference between the first air pressure of the first compartment and the second air pressure of the second compartment within a predetermined time period; and
with at least one of a wave-shaped or concave-shaped surface, interacting with the door panel such that the rotational movement of the door panel is decelerated.

\* \* \* \* \*